US007494139B2

(12) United States Patent
Turner et al.

(10) Patent No.: US 7,494,139 B2
(45) Date of Patent: Feb. 24, 2009

(54) ENHANCED PATIENT MOBILITY SYSTEM

(76) Inventors: David B. Turner, 129 Eaglecrest Dr., Eagleville, TN (US) 37060; Ralph Myers, 1414 Floyd Rd., Eagleville, TN (US) 37060

( * ) Notice: Subject to any disclaimer, the term of this patent is extended or adjusted under 35 U.S.C. 154(b) by 0 days.

(21) Appl. No.: 11/800,076

(22) Filed: May 4, 2007

(65) Prior Publication Data

US 2008/0272571 A1 Nov. 6, 2008

(51) Int. Cl.
*B62M 1/00* (2006.01)

(52) U.S. Cl. ............................. 280/87.021; 280/47.34; 280/87.041; 135/67

(58) Field of Classification Search ................... 135/65, 135/66, 67; 280/47.34, 87.01, 87.021, 87.041, 280/87.051
See application file for complete search history.

(56) References Cited

U.S. PATENT DOCUMENTS

| | | | | |
|---|---|---|---|---|
| 4,251,044 | A | 2/1981 | Olson | |
| 4,342,465 | A * | 8/1982 | Stillings | 280/87.051 |
| 5,217,419 | A | 6/1993 | Harwood | |
| D352,260 | S | 11/1994 | Adamo | |
| 5,411,044 | A | 5/1995 | Andolfi | |
| 5,476,432 | A * | 12/1995 | Dickens | 482/67 |
| 5,479,953 | A | 1/1996 | Pasulka | |
| 5,531,238 | A | 7/1996 | Azzarelli et al. | |
| 5,551,105 | A | 9/1996 | Short | |
| 5,704,577 | A | 1/1998 | Gordon | |
| 6,578,594 | B1 | 6/2003 | Bowen et al. | |
| 6,595,530 | B2 * | 7/2003 | Wood | 280/42 |
| 6,601,864 | B1 * | 8/2003 | Hoyt | 280/304.1 |
| 6,672,321 | B2 | 1/2004 | Hamilton | |
| 6,743,156 | B1 | 6/2004 | Jacques et al. | |
| 7,243,666 | B2 * | 7/2007 | Carroll | 135/67 |
| 7,294,094 | B1 * | 11/2007 | Howle | 482/69 |
| 2002/0101048 | A1 * | 8/2002 | Sword | 280/47.38 |

* cited by examiner

*Primary Examiner*—Christopher P Ellis
*Assistant Examiner*—John D Walters

(57) ABSTRACT

The invention is an Enhanced Patient Mobility System for use by ambulatory or recovering patients. The Enhanced Mobility System is fabricated from sturdy tubular material and has a lower U-shaped base frame member mounted on casters with an upwardly extending mid frame member and two identical side frame members lying in parallel planes and each attached at it's lower extremity to the lower U-shaped base frame member. The U-shaped base frame member, the mid frame member and the two identical side frame members define a walking space for the patient with provision for the possibility of the patient also being able to move about with oxygen tanks, a patient intravenous drip apparatus and other medical devices and apparatus which must be transported by an ambulatory patient.

6 Claims, 4 Drawing Sheets

ENHANCED PATIENT MOBILITY SYSTEM

BACKGROUND OF THE INVENTION

The invention described herein is a Enhanced Patient Mobility System (EPMS) for use by ambulatory or recovering patients. Frequently it is important for hospital patients to be ambulatory as soon as possible to enable a shorter post operative recovery and hospital stay. Many times it is a problem to provide ambulatory patients with a way for them to move about. The most frequent means of providing ambulatory assistance to a patient is the use of a patient stand; however, patient stands commonly have a relatively narrow base and are easily upset if the wheels encounter an obstruction or irregularity in the surface upon which they are traveling. Because the stands are relatively unstable there is the danger of upsetting the stand and causing the patient to trip and fall. Such accidents endanger the patient and others, not to mention the potential damage to equipment and interruption of treatment frequently necessary while patients are ambulatory. Such treatments may include the intravenous administration of nourishment, vitamins, medications, blood plasma, liquids, oxygen, catheterization equipment, infusion pumps, ventilation, suction devices, and the like. Very typically patients will require at least oxygen being administered. Consequently it may be necessary to provide means for transporting not only an oxygen cylinder but other treatment apparatus at the same time. Advantageously such treatment apparatus is supported by a self-contained Enhanced Patient Mobility System (EPMS) which also provides means for the patient to rest upon the onset of fatigue. Preferably the ambulatory apparatus is easily cleanable and therefore can be used by multiple patients in a given time period. Very typically such devices however are cumbersome and difficult to maneuver and provide little in the way of equipment and personal effects storage and mobility. The present invention however is a low cost, sturdy, tubular EPMS which addresses the shortcomings of those presently available.

SUMMARY OF THE INVENTION

The present invention is a Enhanced Patient Mobility System (EPMS) for use by ambulatory or recovering patients in and about the home, rehab, sub-acute, and hospital facilities. It provides such person with ease of mobility, stability and the ability to transport needed treatment apparatus and necessities.

One object of the present invention is to provide a low cost, sturdy, tubular framework which is easily cleanable and easily maneuverable having sufficient carrying capacity to meet an ambulatory patient's needs. In this regard it is necessary for the EPMS to provide walking space for the patient which is approachable from the rear of the EPMS with the EPMS being wide enough to establish a stable, secure base member. It is a function of the present invention to provide parallel bars for supporting apparatus in the form of two cross bar members, at or above knee level. It is also an object of the present invention to provide a stable difficult to tip EPMS device having six conductive castor type wheels four of which are located forward of the patient's center of gravity to enable the patient to rest by leaning on the device and move easily forward even on different surfaces/terrain. It is a further object of the invention to provide support means at a level above the patients head to accommodate intravenous equipment such as medical drips and the like. It is a further object of the invention that the user be able to use the device in association with a wheelchair and/or bed so that transference from the wheelchair to the device is safe and easy to accomplish with qualified personnel assisting.

Specifically the invention is a EPMS for use by ambulatory or recovering patients in and about home, rehab, sub-acute, and hospital facilities providing such person with ease of mobility, stability and the ability to transport needed treatment apparatus and necessities comprising: a low-cost, sturdy, tubular framework having a lower U-shaped base frame member, an upwardly extending midframe member and two identical side frame members standing in parallel planes each attached at its lower extremity to the lower U-shaped base frame member and at its midsection to the upward extending midframe member wherein the lower U-shaped base frame member includes a crossbar member interconnecting the two legs of the U-shaped base frame member at a distance from the terminal ends of the legs of the U-shaped member to provide walking space for the patient and wherein the two identical side frame members are also generally U-shaped with the bow of the U upwardly extending and the two downwardly extending legs of the U being attached to opposite sides of the midframe member and each side frame member having one leg of the U-shaped member extending beyond the midframe member and terminating in a castor type wheel, the lower U-shaped member further having four conductive castor type wheels, two of which are attached each to a separate distil end of the U-shaped base frame member and two of which are attached in spaced relationship from each other on the bow of the U-shaped base frame member, there being a total of six conductive castor type wheels lying in the same plane, the EPMS further comprising two support bars each extending from the midframe member to a separate extended end of a separate side member at a point above the plane of the castor type wheels for facilitating the support of necessary medical devices and apparatus which must be transported by a ambulatory patient, and a ambulatory optional carrying basket attached to the extended midframe member at a point between and above the four forwardmost castor type wheels, the EPMS further comprising two rigid support bars attached to and extending from the U-shaped base frame member at a point above the point of attachment of the two forwardmost castor type wheels in spaced relationship to each other upwardly at an incline and attached to the midframe member at the forwardmost point of attachment of the U-shaped side frame members, the EPMS further comprising two parallel upstanding single bar supports running from the crossbar of the lower base frame member and attached to the forwardmost portion of the upwardly extending midframe member and being provided each with a gas cylinder holder for holding oxygen and like needed gases, the side frame members being attached to each other by a crossbar attached and extending therebetween at the highest point of the side frame members which is not higher than about 6.25 feet above the plane of the conductive castor type wheels.

DETAILED DESCRIPTION AND PREFERRED EMBODIMENT

Figure 1:
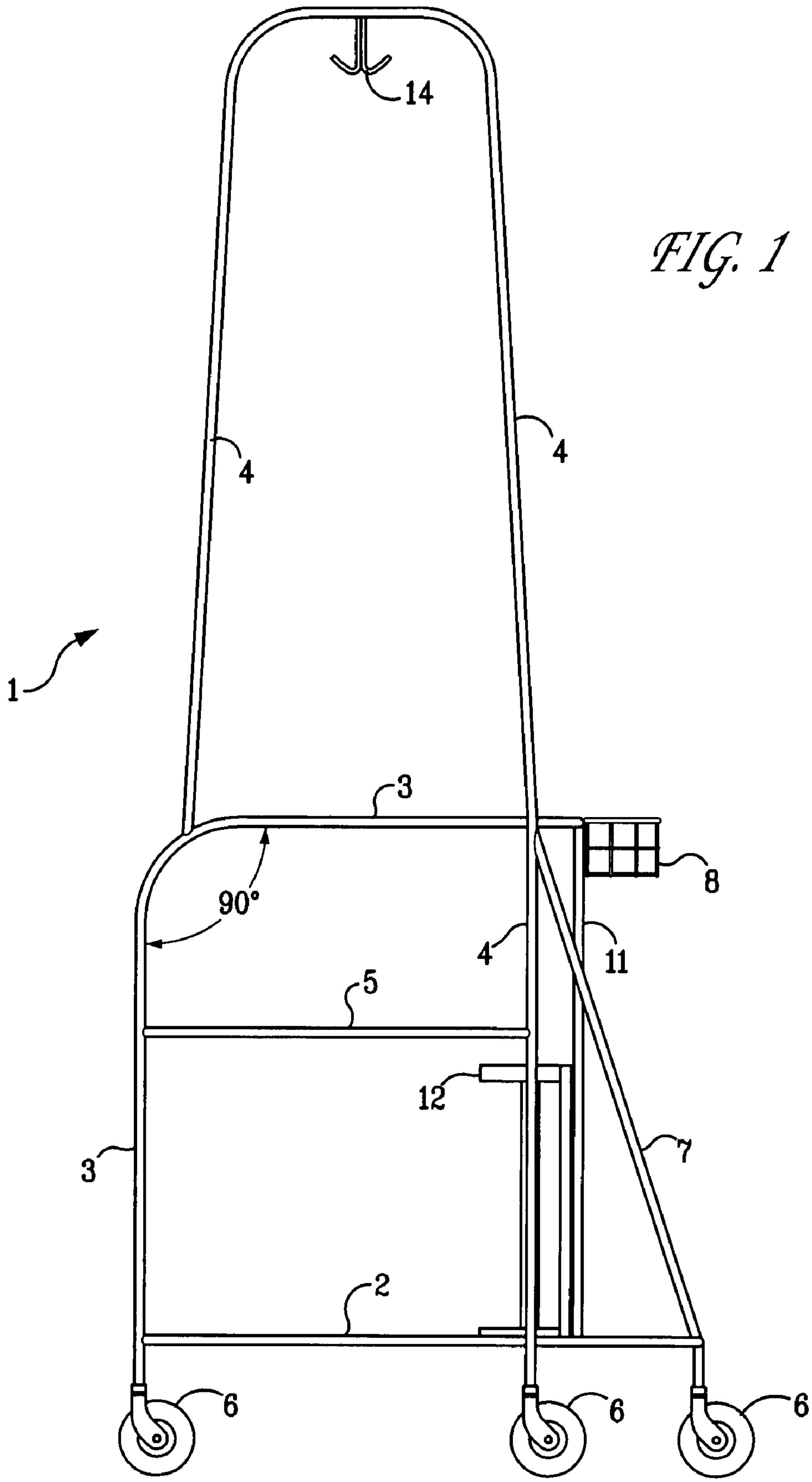
FIG. 1 is a side view of the EPMS of the present invention.
Figure 2:
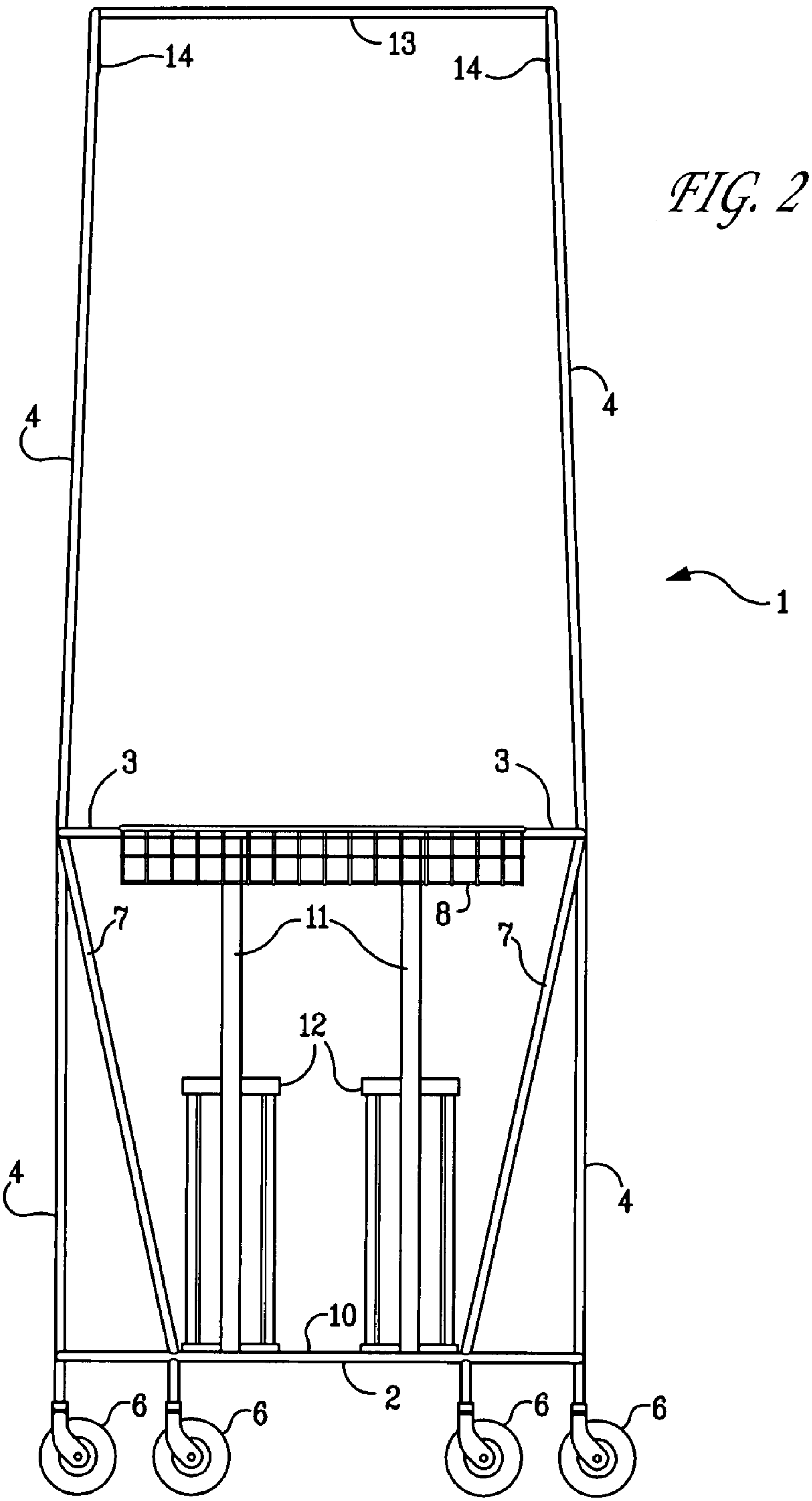
FIG. 2 is a front view of the EPMS of the present invention.
Figure 3:
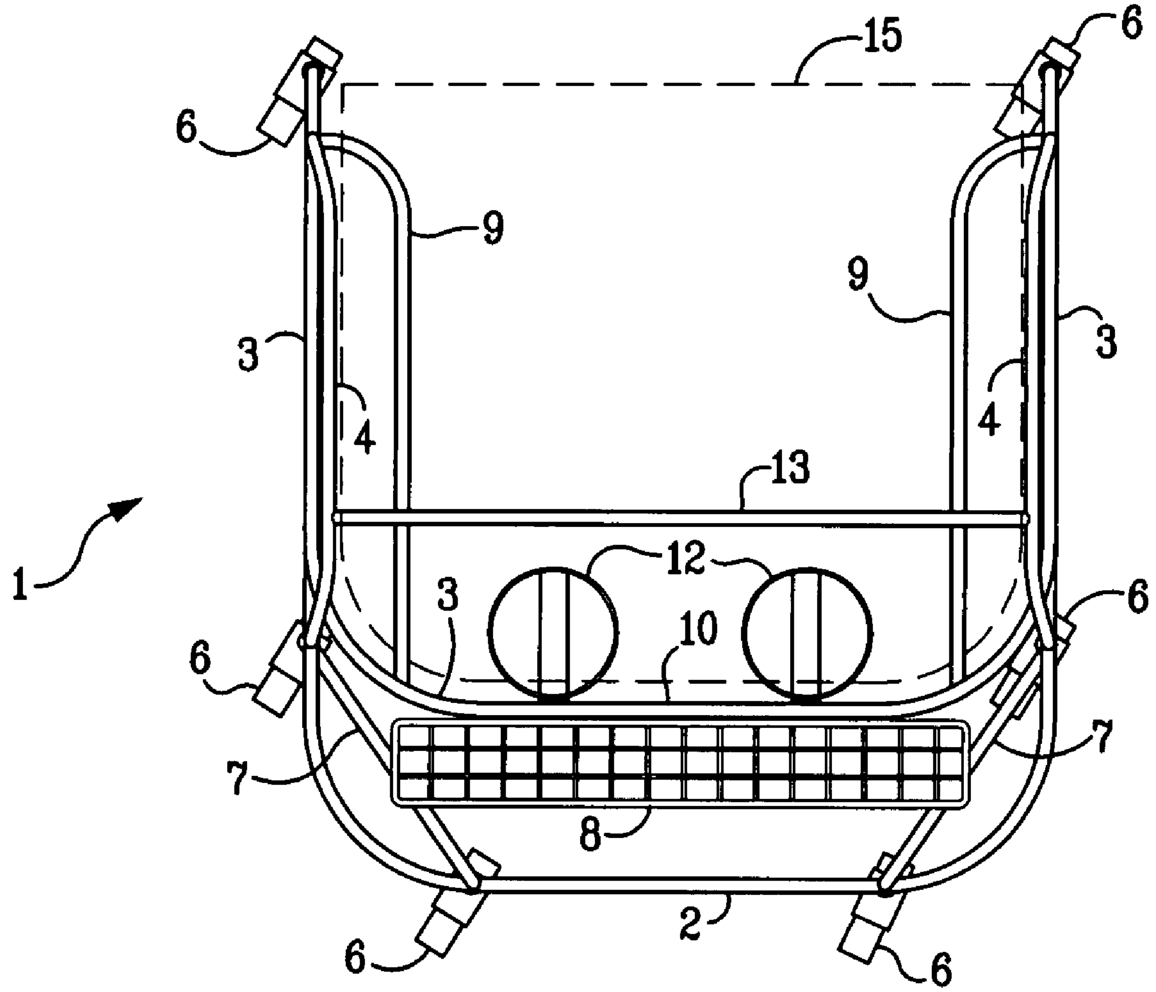
FIG. 3 is a top view of the EPMS of the present invention.
Figure 4:
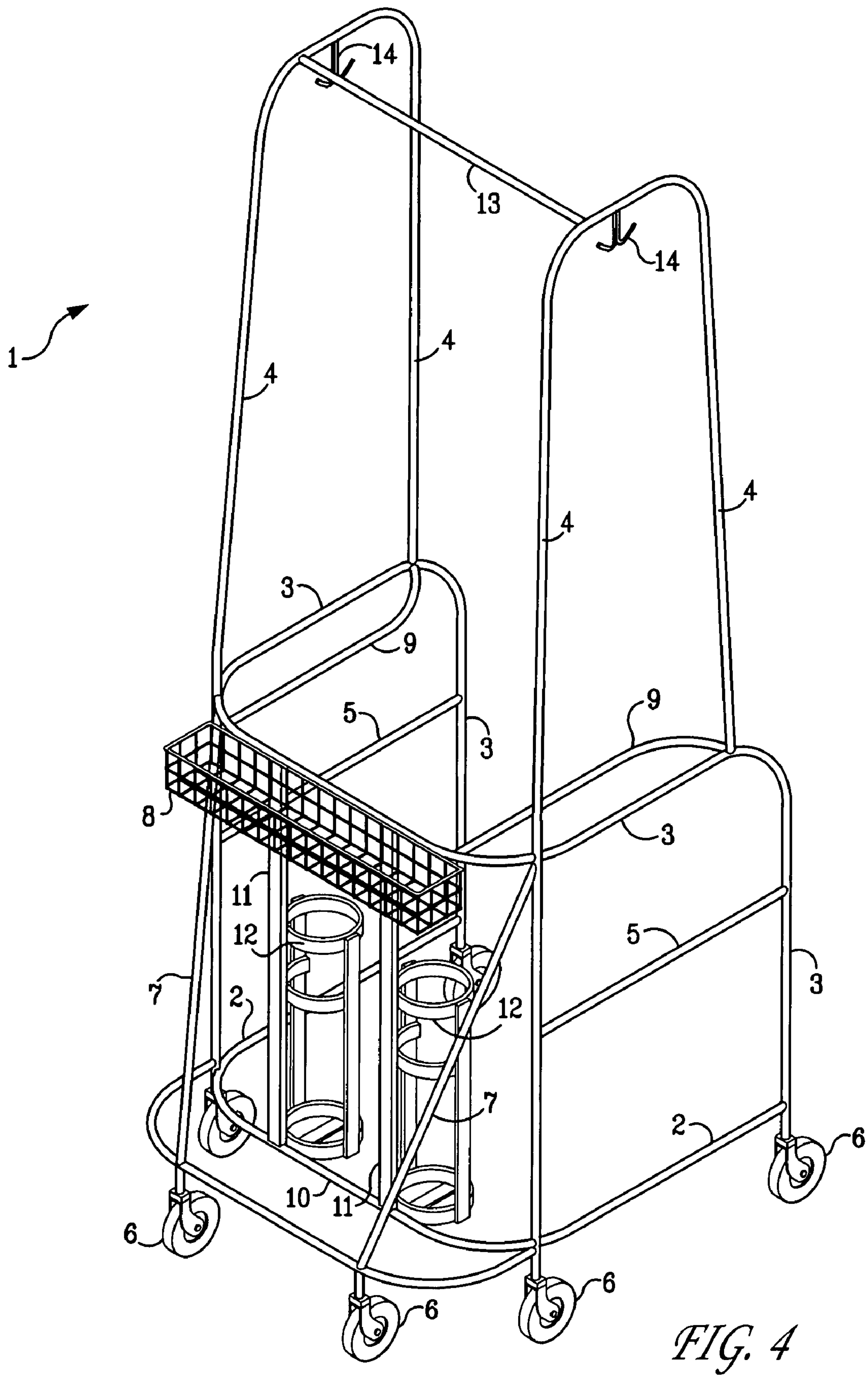

The present invention is a EPMS 1 for use by ambulatory or recovering patients which is of simple design yet is durable, sturdy, mobile and easy to clean. There are three major components to the EPMS. The first is a lower U-shaped base frame member 2. The base frame member like the entire EPMS is preferably constructed of aluminum or light steel tubing. Preferably one-half (½) or (¾) inch aluminum conduit is used. The various parts are fabricated together by welding or other suitable attachment means including but not limited to nuts and bolts, screws, clamping fasteners, adhesives and the like, all of which are known to those skilled in the art. The lower U-shaped base frame member has rounded corners so as not to present sharp corners which could pose a safety hazard or could easily catch on adjacent items. The rounded corners can serve as a bumper means allowing the EPMS to easily glance off items inadvertently contacted while the EPMS is in use. The lower U-shaped base frame member is supported by six conductive castor type wheels 6 which lie in a plane parallel to the plane defined by the lower U-shaped base frame member. These castor type wheels are preferably sized to enable the patient to travel over different surfaces/terrain in addition to a typical tile or terrazzo floor. The diameter of the conductive castor type wheels is preferably in the range of 3 to 6 inches with a diameter of 4 inches being most preferred. An upwardly extending midframe member 3 is a U-shaped tubular member bent at a 90 degree angle at a location above its midpoint such that it provides a patient receiving area when attached to the lower U-shaped base frame member. Side frame members 4 are once again U-shaped members identical to each other, each having one leg longer than the other. When attached to the upwardly extending midframe member these legs connect the U-shaped member and the lower U-shaped base frame member to give vertical support thereto. The principal structural elements of the EPMS are thus the lower U-shaped base frame member, the upward extending midframe member and the side frame members. These elements when fastened together as shown in FIGS. 1, 2 and 3 define a cage-like area which gives an invalid or recovering patient mobility, support and provides for the transportation of necessary treatment apparatus. In addition two basic structure crossbar members 5 are attached between an upstanding leg of the midframe member 3 and one of the extended legs of the side frame members 4. These crossbar members are generally horizontal, parallel to the plane defined by the lower U-shaped base frame member and are positioned preferably approximately 16 to 18 inches thereabove. The positioning of these crossbar members is such that saddlebags or like paraphernalia can be supported thereby to additionally provide for the transportation of necessities and supplemental items. These crossbar members also provide additional stability to the basic EPMS framework thus they serve two purposes. Referring now to FIG. 2, the two parallel upstanding single bar supports 11 can be seen running from the front crossover bar 10 of the lower base frame member and attached to the forwardmost portion of the upwardly extending midframe member, each being provided with a gas cylinder holder for holding oxygen and like needed gases. Additionally rigid support bar 7 can be seen attached to and extending from the U-shaped base frame member at a point above the plane of attachment of the two forwardmost castor type wheels in spaced relationship to each other inclining upwardly and attached to the midframe member at the forwardmost point of attachment of the U-shaped side frame members to add dimensional stability and rigidity. Also shown is a carrying basket 8 as seen in FIG. 3 which is attached to the midframe member 3 to provide additional carrying capacity for patient related items. Also seen in FIG. 3 are gripping handles 9. These handles are parallel to and adjacent the midframe members uppermost portion. They serve the function of providing the primary gripping means for the patient but they also reinforce the structure of the EPMS. They are in the same plane as the uppermost portion of the midframe member and as such along with the midframe member provide convenient tubular support area should the patient decide to support himself. These gripping handles are preferably about 22 inches apart thus providing sufficient room for the patient without crowding but also not being out of reach. Lastly interconnect bar 13 is shown interconnecting the upwardly extending midframe members 3 at their highest point. This interconnect bar may be used to accommodate intravenous equipment such as medical drips and the like which can be provided in association with one of the double hooks 14. The overall dimensions of the walker system are important since equipment in many hospitals has roughly the same dimensions. The sizing of the walker is described hereinafter.

There are several objectives in sizing the EPMS which dictate in some measure its preferred dimensions. It is important to provide adequate walking space for the ambulatory patient within the patient space 15 as shown in dashed lines in FIG. 3. A satisfactory distance between the legs of the lower U-shaped base frame member is about 28 inches. This distance is adequate for the patient to stand and walk as well as turn from side to side to access things from tables, shelves and the like. Notice however that the preferred distance between gripping handles 9 is about 22 inches. This means that the patient space 15 actually narrows at the patient's waist section as the body narrows from hips to waist. The narrowing patient space means that the patient has a very ready means of support and creates a feeling of comfort and stability by the apparatus. As discussed earlier, gripping handles 9 actually form a shelf-like plane in association with the midframe members uppermost proportion to provide immediate waist high support when needed.

The overall dimension of the EPMS from side to side is 28 inches. This enables the patient to pass through 30 inch doors which are generally the smallest found in living units and healthcare facilities. It should be noted that it is possible for the castor type wheels to pass through a 30 inch opening. The front-most castor type wheels 6 however are positioned at a distance of about 16 inches and have rigid support bars 7 extending thereabove. This arrangement provides the maximum support for the patient since the two forwardmost castor type wheels do not track with the four following wheels. Forward tipping of the EPMS is thus almost completely eliminated while ease of navigation is enhanced. It should be noted that upstanding single bar supports 11, having gas cylinder holders 12, are located within the dimension between the forwardmost castor type wheels. Preferably the upstanding single bar supports are spaced about a 10½ inches apart.

It should be noted that side frame members 4 actually taper slightly inwardly so that at their upward most position they are approximately 26¾ inches apart. This dimension can be seen to be greater than the 22 inch distance between gripping handles 9. The purpose of the narrowing of the side frame members as they extend upwardly is so that when tubular drips and other paraphernalia are hung from double hooks 14 all of those items still can pass through the 28 inch space defined by separation between the castor type wheels on the lower U-shaped base frame member. The double hooks 14 have been found to be most useful if the distance between the ends of the hook legs is a maximum of about 3¼ inches.

Also it should be noted that the forward distance between the two rear most castor type wheels and the next two most forward wheels is about 21½ inches. This distance coincides with the natural stride of a patient and essentially defines the length of patient space 15. The wheels referred to above, which are in the forwardmost direction, are those castor type wheels which are at the termination of the extended leg of the side frame members mentioned earlier. The lead wheels which are attached in spaced relationship from each other on the bow of the U-shaped base frame member are about 30½ inches forward of the rear most castor type wheels so that the size of the U-shaped base frame member is about 30½ inches by about 28 inches. The gripping handles are about 34½ inches above the plane defined by the castor type wheels with the crossbar members being about 27½ inches above the plane. The height of about 27½ inches has been found to be an acceptable height to give rigid support to the EPMS and yet provide a hanging means which can accommodate items draped thereover needed by the ambulatory patient.

The U-shaped base frame member itself is about 7 inches above the plane defined by the six castor type wheels thus giving adequate space for foot movement of the ambulatory patient. Also the oxygen bottle holders are preferably about 16 inches in height and extend from the U-shaped base frame member to the crossbar members. This leaves a clearance of about 11½ inches from the top of the oxygen bottle holder to the plane defined by the uppermost portion of the upward extending midframe member and the gripping handles. The uppermost level of the carrying basket is also in the same plane.

The uppermost portion of the sideframe members is about 39 inches thus giving the EPMS a total height of approximately 6¼ feet. The sideframe members narrow from their point of attachment to the upward extending midframe member to their highest point declining from a spread of 19 inches to approximately 14½ inches, there being a 2½ inch portion of the upward extending midframe member extending beyond the forwardmost point of attachment of the upward extending midframe member 3 and the side frame members 4. The optional hanging basket is attached to and extends forward of this bar.

It is clear from the above discussion that the EPMS of the present invention has been carefully designed to optimize the needs of an ambulatory patient while at the same time taking into consideration real live requirements of such a EPMS.

Having thus described the invention what is claimed is:

1. A Enhanced Patient Mobility System for use by ambulatory or recovering patients in and about home, rehab, subacute, and hospital facilities providing such patients with ease of mobility, stability and the ability to transport needed treatment apparatus and necessities comprising: a low-cost, sturdy, tubular framework having a lower U-shaped base frame member having a first and second leg, an upward extending midframe member and two identical side frame members lying in parallel planes each attached at its lower extremity to said lower U-shaped base frame member and at its midsection to said upward extending midframe member wherein said lower U-shaped base frame member includes a crossbar member interconnecting the two legs of said lower U-shaped base frame member at a distance from the terminal ends of the legs of said lower U-shaped base frame member to provide walking space for the patient and wherein said two identical side frame members are also generally U-shaped with the bow of their shape upwardly extending and the two downwardly extending legs of said U-shaped side members being attached to opposite sides of said upward extending midframe member and each side frame member having one leg of said U-shaped side member extending beyond the midframe member and terminating in a castor type wheel, the lower U-shaped base frame member further having four castor type wheels, two of which are attached each to a separate distil end of said lower U-shaped base frame member legs and two of which are attached in spaced relationship from each other on the bow of said lower U-shaped base frame member, there being a total of six castor type wheels lying in the same plane, the Enhanced Patient Mobility System further comprising two support bars each extending from the midframe member to a separate extended end of a separate side member at a point above the plane of the castor type wheels for facilitating the support of necessary medical devices and apparatus which must be transported by a ambulatory patient, the Enhanced Patient Mobility System further comprising two rigid reinforcing bars attached to and extending from said lower U-shaped base frame member at a point above the point of attachment of said two forwardmost castor type wheels in spaced relationship to each other upwardly at an incline and attached to the midframe member at the forwardmost point of attachment of said U-shaped side frame members, said U-shaped side frame members being attached to each other by an interconnect bar attached and extending there between at the highest point of said side U-shaped frame members.

2. The Enhanced Patient Mobility System of claim 1 wherein each of the two support bars extend from the midframe member to a U-shaped side member at a point approximately two feet above the plane of the castor type wheels.

3. The Enhanced Patient Mobility System of claim 1 wherein the U-shaped side frame members each include a double hook mounted to the bow of the U-shaped side frame member and extending downwardly there from to facilitate the hanging and support of tubes and other patient enabling items/devices.

4. The Enhanced Patient Mobility System of claim 1 including a carrying basket attached to the upwardly extending midframe member at a point between and above the four forwardmost castor type wheels.

5. The Enhanced Patient Mobility System of claim 1 further comprising two parallel upstanding single bar supports running from the crossbar of the lower base frame member and attached to the forwardmost portion of the upwardly extending midframe member and being provided with a gas cylinder holder for holding oxygen and like needed gases.

6. The Enhanced Patient Mobility System of claim 1 wherein the highest point of the side frame members is not higher than about 6.25 feet above the plane of the castor type wheels.

* * * * *